US 011578970B2

(12) United States Patent
Isei et al.

(10) Patent No.: US 11,578,970 B2
(45) Date of Patent: Feb. 14, 2023

(54) SURFACE FOLLOWING NOZZLE, OBSERVATION DEVICE FOR MOVING OBJECT SURFACE, AND OBSERVATION METHOD FOR MOVING OBJECT SURFACE

(71) Applicant: NIPPON STEEL CORPORATION, Tokyo (JP)

(72) Inventors: Yoshito Isei, Tokyo (JP); Tomoya Kato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 352 days.

(21) Appl. No.: 16/766,960

(22) PCT Filed: Aug. 22, 2018

(86) PCT No.: PCT/JP2018/031014
§ 371 (c)(1),
(2) Date: May 26, 2020

(87) PCT Pub. No.: WO2019/111448
PCT Pub. Date: Jun. 13, 2019

(65) Prior Publication Data
US 2021/0033391 A1    Feb. 4, 2021

(30) Foreign Application Priority Data

Dec. 4, 2017 (JP) .............. JP2017-232957

(51) Int. Cl.
*G01B 13/12* (2006.01)
*G01B 13/22* (2006.01)
*B05B 12/12* (2006.01)

(52) U.S. Cl.
CPC .......... *G01B 13/12* (2013.01); *B05B 12/124* (2013.01); *G01B 13/22* (2013.01)

(58) Field of Classification Search
CPC ........ G01B 13/12; G01B 13/22; B05B 12/124
See application file for complete search history.

(56) References Cited

U.S. PATENT DOCUMENTS 5,331,178 A    7/1994   Fukuda et al.
5,938,954 A *  8/1999   Onuma .............. B23K 26/1224
                                                        219/121.75
(Continued)

FOREIGN PATENT DOCUMENTS

CN    106423608 A    2/2017
JP    5-10888 A      1/1993
(Continued)

OTHER PUBLICATIONS

Zhang, Xinrui et al. "Friction and Wear Behavior of Basalt-Fabric-Reinforced/Solid-Lubricant-Filled Phenolic Composites" Journal of Applied Polymer Science DOI 10.1002/app, May 12, 2010. (Year: 2010).*

(Continued)

*Primary Examiner* — Paul M. West
(74) *Attorney, Agent, or Firm* — Birch, Stewart, Kolasch & Birch, LLP

(57) ABSTRACT

The present invention provides a surface following nozzle, an observation device for a moving object surface, and an observation method for the moving object surface that can remove water in the vicinity of the nozzle while following changes in the shape and changes in the distance of a moving object. A surface following nozzle includes a nozzle that injects gas from a tip end thereof, a separating part that closes a base end of the nozzle, and an extending and contracting part that is provided at a rear side of the nozzle via the separating part, and extends and contracts along an (Continued)

axial direction of the nozzle. The extending and contracting part includes an elastic body that applies a forward force with respect to the nozzle.

12 Claims, 8 Drawing Sheets

(56) References Cited

U.S. PATENT DOCUMENTS

| | | | | |
|---|---|---|---|---|
| 5,948,292 | A | * | 9/1999 | Tanaka ............... B23K 26/1476 219/121.84 |
| 2004/0021855 | A1 | | 2/2004 | Franssen et al. |
| 2008/0023051 | A1 | | 1/2008 | Yoshimura et al. |
| 2015/0239027 | A1 | | 8/2015 | Alken et al. |
| 2017/0259789 | A1 | * | 9/2017 | McAndrew ............. B60S 1/528 |

FOREIGN PATENT DOCUMENTS

| | | |
|---|---|---|
| JP | 6-138044 A | 5/1994 |
| JP | 7-229733 A | 8/1995 |
| JP | 8-68759 A | 3/1996 |
| JP | 2004-517324 A | 6/2004 |
| JP | 2009-85843 A | 4/2009 |
| JP | 2015-527199 A | 9/2015 |
| KR | 20-1997-0044979 U | 7/1997 |

OTHER PUBLICATIONS

International Search Report for PCT/JP2018/031014 dated Oct. 2, 2018.
Korean Notification of Reason for Refusal for Korean Application No. 10-2020-7017642, dated Oct. 7, 2021, with an English translation.
Extended European Search Report for European Patent Application No. 18885174.5, dated Jul. 19, 2021.

* cited by examiner

SURFACE FOLLOWING NOZZLE, OBSERVATION DEVICE FOR MOVING OBJECT SURFACE, AND OBSERVATION METHOD FOR MOVING OBJECT SURFACE

TECHNICAL FIELD

The present invention relates to a surface following nozzle, an observation device for a moving object surface, and an observation method for a moving object surface.

BACKGROUND ART

In rolling mills of steel sheets, in order to manufacture rolling steel sheets having an excellent surface and an excellent shape, it is important to grasp a surface state of a rolling roll and accurately grasp a profile, in other words, a radius distribution in a roll axial direction, thereby enabling a replacement timing of the rolling roll to be determined and enabling control with a feedback to a rolling condition or a cooling condition.

For example, a rolling roll during hot rolling at the high rolled material temperature of approximately 1000° C. receives a severe thermal influence regardless that the rolling roll is cooled as the time elapses, and thus becomes a surface roughness degradation in which a surface thereof is uneven. When rolling is performed using the rolling roll on which such roughness has occurred, a scale generated on a convex portion is pressed by the rolling roll, is pushed into a rolled material, and is bitten into the steel sheet surface, whereby scale defects are generated. For this reason, the rolling amount until the roll is replaced has been determined in advance, and the roll is replaced in a planned way, however, in this method, the rolling amount needs to be set focusing on the safe side, which has caused lowering of the availability factor.

In a rolling roll during hot rolling, when a rolled material is stretched with a high rolling force, the roll expands in the radial direction by heat, and a roll diameter decreases by wear only at a portion through which the rolled material has passed. Changes in a diameter in the roll axial direction, in other words, a profile, cannot be accurately grasped to cause the generation of a thickness failure in the rolled material and a shape failure. Therefore, the expansion and wear amounts by heat have been conventionally estimated by a computer from data such as the actual condition of the rolled material and the roll coolant amount to obtain a rolling roll profile, however, the accuracy of this method is not high, and thus a shape failure has occurred.

As measures to such problems, have been proposed a roll surface observation method in which a roll surface is photographed by a camera, and a method in which a distance from a predetermined position to a roll surface is measured by an ultrasonic range finder or the like to calculate a roll radius, and a roll profile is measured on the basis of the calculated value.

A device for observing a surface of a rolling roll described in PTL 1 supplies water to the rolling roll from a nozzle, forms a water column between the rolling roll and the nozzle, and photographs a roll surface by a camera via the formed water column.

A method of measuring a roll profile described in PTL 2 includes generating a water column between a probe into which an ultrasonic range finder is embedded and a rolling roll, obtaining a distance from the time during when pulsed ultrasonic emitted from the range finder reciprocates between the probe and the roll surface, and scanning the range finder along a guide rail in a roll axial direction, thereby measuring the roll profile.

A surface inspection device described in PTL 3 includes an inspection device having a light source and a light receiving part, a cylindrical nozzle provided along an axis of light beams that are emitted from the light source, and a movable nozzle provided in the inside of the cylindrical nozzle. The movable nozzle is pushed out toward a rolling roll by water passing through the movable nozzle from the cylindrical nozzle, and a gap between the movable nozzle and the rolling roll is adjusted by the flow velocity of the water.

CITATION LIST

Patent Literatures

PTL 1: JP-A-2009-85843
PTL 2: JP-A-7-229733
PTL 3: JP-T-2004-517324

SUMMARY OF INVENTION

Technical Problem

In any of the methods of PTLs 1 to 3, in order to secure a measurement route in a large amount of cooling water, a water column is required to be formed between the rolling roll and the observation camera or the range finder. Bubbles are generated in an inside of such a water column by an interference between the roll and the cooling water. The bubbles may cause a failure in the observation and noise in the ultrasonic range finder, which results in a failure in the measurement in some cases. A highly accurate optical sensor such as a laser range finder cannot be applied in the measurement in which water that easily causes variations in refractive index by the flow rate and the temperature is used as a medium.

The present invention aims to provide a surface following nozzle, an observation device for a moving object surface, and an observation method for a moving object surface that can remove water in the vicinity of the nozzle while following changes in the shape and changes in the distance of a moving object.

Solution to Problem

A surface following nozzle according to the present invention includes: a nozzle that injects gas from a tip end thereof; a separating part that closes abase end of the nozzle; and an extending and contracting part that is provided at a rear side of the nozzle via the separating part, and extends and contracts along an axial direction of the nozzle, in which the extending and contracting part includes an elastic body that applies a forward force with respect to the nozzle.

An observation device for a moving object surface according to the present invention includes: the surface following nozzle; an environment box provided at a rear side of the surface following nozzle; and an optical observing part housed inside the environment box, in which an observation optical path is provided from the optical observing part over the nozzle tip end.

An observation method for a moving object surface according to the present invention includes: monitoring a moving object, using an observation device for a moving object surface, including: a surface following nozzle including a nozzle that injects gas from a tip end thereof; a separating part that closes a base end of the nozzle; and an extending and contracting part that is provided at a rear side of the nozzle via the separating part, and extends and contracts along an axial direction of the nozzle, in which the extending and contracting part is provided with an elastic body that applies a forward force with respect to the nozzle; an environment box provided at a rear side of the surface following nozzle; and an optical observing part housed inside the environment box, an observation optical path is provided from the optical observing part over the nozzle tip end; and determining a timing to replace the moving object or controlling a use condition of the moving object.

Advantageous Effects of Invention

The surface following nozzle in the present invention can follow changes in the shape and changes in the distance of the moving object because the extending and contracting part extends and contracts. Gas is injected from the nozzle at a predetermined flow velocity to enable water in the vicinity of the nozzle tip end to be removed. Accordingly, by using the surface following nozzle, it is possible to observe the moving object surface without receiving an influence by the water.

BRIEF DESCRIPTION OF DRAWINGS

FIG. 6A is a graph illustrating a relation between the gap and a flow rate and FIG. 6B is a graph illustrating a relation between the nozzle back pressure and the flow rate.

FIG. 7A is a graph illustrating a relation between a push-in amount and the nozzle back pressure and FIG. 7B is a graph illustrating a relation between the gap and the nozzle back pressure.

FIG. 9A illustrates the result at the push-in amount of 0 mm, FIG. 9B illustrates the result at the push-in amount of 6 mm, and FIG. 9C illustrates the result at the push-in amount of 12 mm.

DESCRIPTION OF EMBODIMENTS

Hereinafter, an embodiment of the present invention will be described in details with reference to the drawings.

(Entire Configuration)

Figure 1:
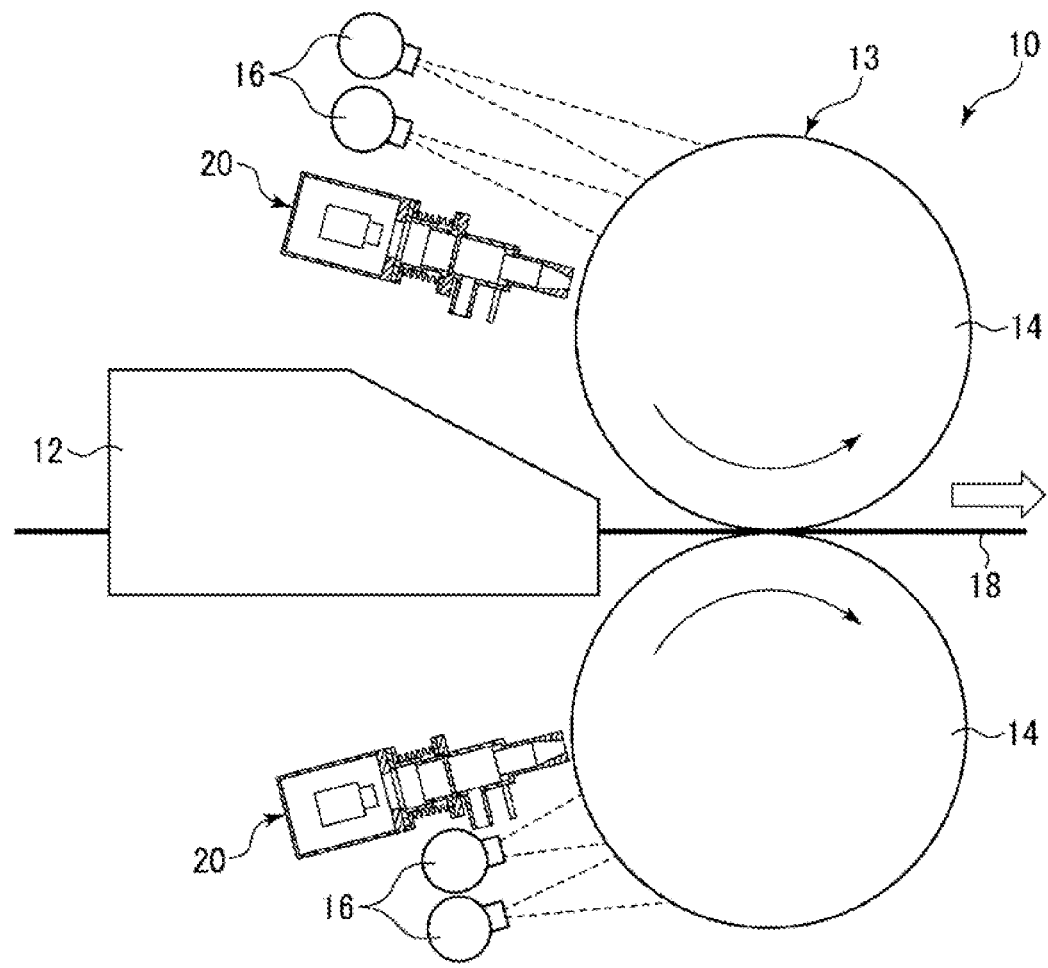
FIG. 1 is a schematic diagram illustrating a hot rolling mill to which an observation device according to an embodiment is applied.

A hot rolling mill 10 illustrated in FIG. 1 is provided with a heating furnace 12, and a rolling mill 13 at a downstream side of the heating furnace 12. The heating furnace 12 blows flames on a rolled material 18 serving as a moving object carried in from an upstream side, thereby heating the rolled material 18. The rolled material 18 after having been heated in the heating furnace 12 is conveyed to the downstream side, and is shifted to a rolling process by the rolling mill 13.

The rolling mill 13 causes the conveyed rolled material 18 to pass through between a pair of cylindrical hot rolling rolls (hereinafter, rolling rolls) 14, and rolls the conveyed rolled material 18 in a predetermined thickness. The actual hot rolling mill 10 is provided with a plurality of the rolling mills 13. Cooling water supplying parts 16 are provided in the rolling mill 13. The cooling water supplying part 16 is disposed at an upstream side of the rolling mill 13, and supplies cooling water to the rolling rolls 14 from the upstream side.

Observation devices 20 are respectively disposed closer to the rolled material 18 than the cooling water supplying parts 16. The observation devices 20 respectively observe surfaces of the rolling rolls 14 immediately prior to coming into contact with the surface of the rolled material 18.

Figure 2:
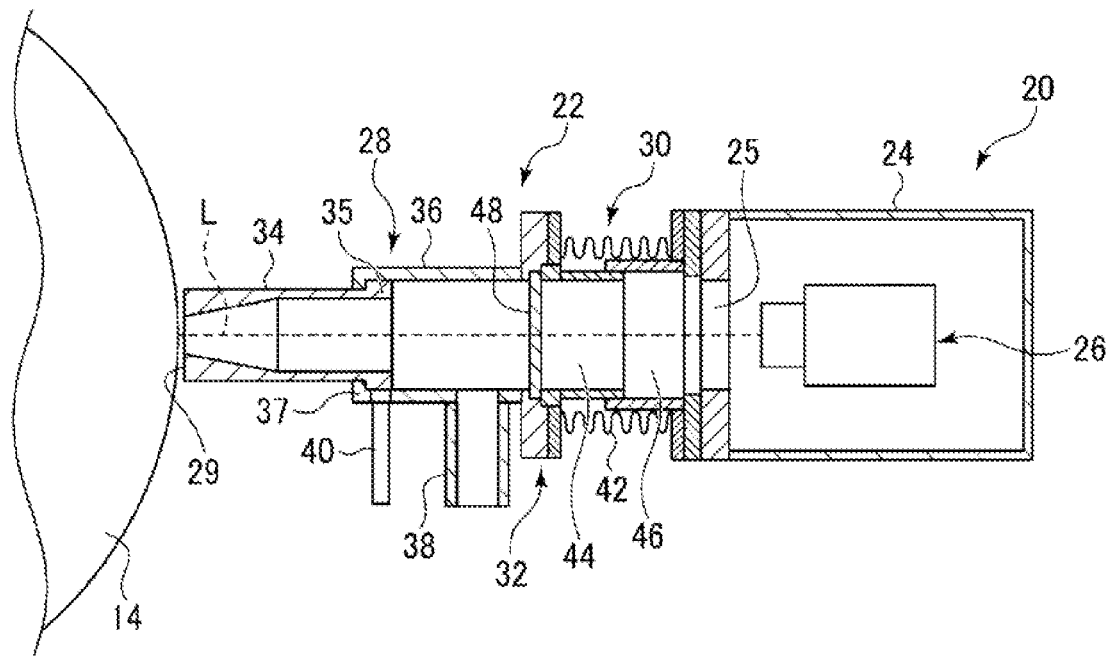
FIG. 2 is a cross-sectional diagram illustrating the observation device according to the present embodiment.

As illustrated in FIG. 2, the observation device 20 is provided with a surface following nozzle 22, an environment box 24, and an optical observing part 26. The surface following nozzle 22 includes a nozzle 28, an extending and contracting part 30, and a separating part 32. In the present description, a tip end (rolling roll side) of the surface following nozzle 22 is referred to as a front side, and a base end (environment box side) thereof is referred to as a rear side.

The nozzle 28 injects gas from the nozzle tip end toward a surface of the rolling roll 14, and removes cooling water in the vicinity of the tip end of the nozzle. In the case of the present embodiment, the nozzle 28 includes an inner nozzle 34, and an outer nozzle 36 disposed outside the inner nozzle 34. The inner nozzle 34 is a tubular member having a cavity that is tapered toward a tip end thereof, and is provided with a flange portion 35 protruding toward the outer side on a base end of the inner nozzle 34. The outer nozzle 36 is a tubular member having an inner diameter larger than that of the inner nozzle 34, and is provided with an edge portion 37 protruding toward the inner side on a tip end thereof. The inner nozzle 34 can be retracted inside the outer nozzle 36, and can protrude with respect to the outer nozzle 36 only before the flange portion 35 comes into contact with the edge portion 37.

Figure 3:
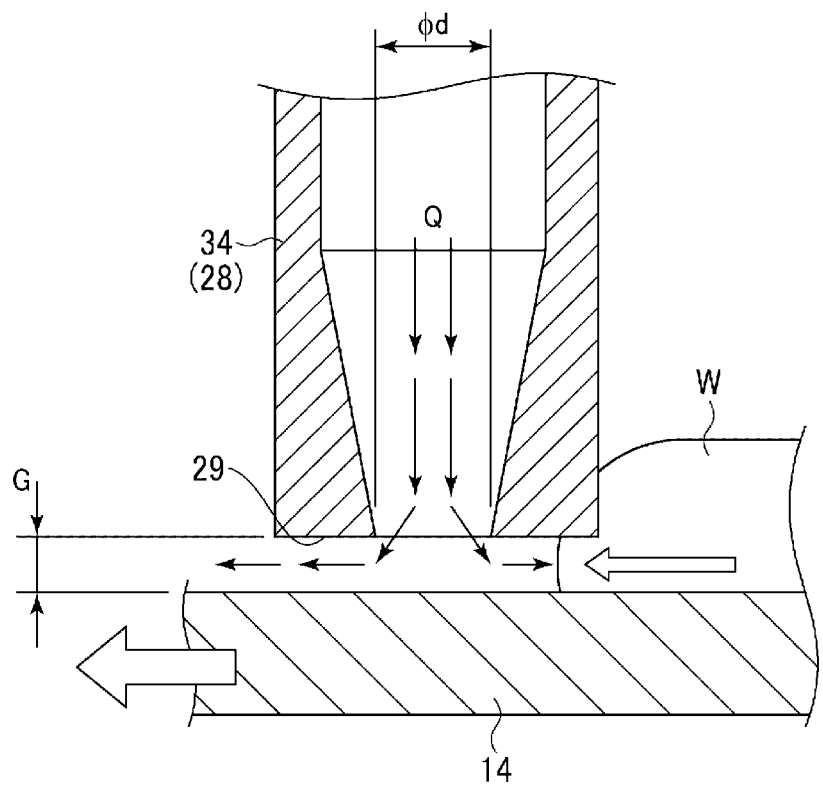
FIG. 3 is a partial cross-sectional diagram of a nozzle according to the present embodiment.

The nozzle tip end includes a flat surface 29 facing the surface of the rolling roll 14. The flat surface 29 is a plane parallel to a direction orthogonal to an axial direction of the nozzle 28. In particular, in a case of the rolling roll 14 that is a cylindrical rotor, even when a shift occurs between a normal line passing through a measurement point at the center on the roll surface and the nozzle center axis (an observation optical path L), the area in the flat portion needs to be secured in order that the roll surface faces the flat surface 29 on the nozzle tip end. The cavity of the inner nozzle 34 is tapered toward the tip end to generate a pressure loss, and the inner nozzle 34 protrudes with respect to the outer nozzle 36. The nozzle tip end having an outer diameter being too thick increases the weight thereof and makes an extending and contracting motion difficult. Therefore, the outer diameter of the flat surface 29 is desirably about twice to four times a nozzle bore d (FIG. 3). Being orthogonal is not limited to a case of being strict orthogonal, but includes a case of being slightly shifted.

In the nozzle 28, the inner nozzle 34 and the outer nozzle 36 are not necessarily formed of the same material. At least the inner nozzle 34 is formed of a material softer than that of the rolling rolls 14. As for the inner nozzle 34, a material having a small friction coefficient, for example, a material containing a solid lubricant is preferable. Specifically, the inner nozzle 34 is preferably formed of a material in which a solid lubricant that improves a lubricating performance, and glass fiber serving as reinforcement fiber are mixed into a phenol resin. As the solid lubricant, graphite, molybdenum disulfide, and the like can be used. The inner nozzle 34 is formed of such a soft material to preferably prevent the rolling roll 14 from being damaged when the tip end of the inner nozzle 34 comes into contact with the rolling roll 14.

The outer nozzle 36 is provided with a first gas inlet and a second gas inlet 40. The first gas inlet 38 communicates with an inside of the outer nozzle 36. Gas supplied to the first gas inlet 38 is injected to an outside through the inside of the outer nozzle 36 from the tip end of the inner nozzle 34. The gas raises the nozzle back pressure to cause the inner nozzle 34 to protrude with respect to the outer nozzle 36. The second gas inlet 40 communicates with a portion between the flange portion 35 and the edge portion 37. Gas supplied to the second gas inlet 40 retracts the inner nozzle 34 having protruded from the outer nozzle 36 to the inside of the outer nozzle 36.

The extending and contracting part 30 is provided at a rear side of the nozzle 28 via the separating part 32. The separating part 32 closes a base end of the nozzle 28. The separating part 32 holds the airtightness so as to prevent the gas supplied to the nozzle 28 from flowing into the extending and contracting part 30. An optical window 48 is fitted into the separating part 32. The optical window 48 is a plate made of glass or resin that allows light emitted from the optical observing part 26 and light reflected on the rolling rolls 14 to pass therethrough.

The extending and contracting part 30 includes an inner tube part 44, an outer tube part 46, and a bellows spring 42 serving as an elastic body. The inner tube part 44 has one tip end that is connected to the separating part 32, and the other end that is inserted into a tip end of the outer tube part 46. The outer tube part 46 has abase end that is connected to a tip end side surface of the environment box 24. The inner tube part 44 has a base end side that can freely be entering and exiting with respect to the outer tube part 46. The inner tube part 44 and the outer tube part 46 are disposed in an inside of the bellows spring 42. The bellows spring 42 has one end that is in contact with a surface of the separating part 32 and the other end that is in contact with the tip end side surface of the environment box 24, and applies a forward force with respect to the nozzle 28 via the separating part 32. The extending and contracting part 30 extends and contracts along the axial direction of the nozzle 28 because the inner tube part 44 enters into and exits from an inside of the outer tube part 46 with the extension and contraction of the bellows spring 42.

The environment box 24 includes an opening 25 on the tip end side surface, and houses the optical observing part 26 in an inside thereof. A base end of the outer tube part 46 is connected to the environment box 24 so as to surround the opening 25. The observation optical path L is formed on a straight line from the opening 25 to the tip end of the inner nozzle 34. As the optical observing part 26, the illumination and a two-dimensional camera, an optical range finder, a laser Doppler velocimeter, a radiation thermometer, or the like can be used.

When the illumination and a two-dimensional camera are used as the optical observing part 26, the surface of the rolling roll 14 is illuminated, and the two-dimensional camera images an image of the surface. It is possible to grasp a surface roughness degradation of the surface of the rolling roll 14 on the basis of the imaged image, and to accurately determine the timing of replacement of the roll and the timing of the surface maintenance.

When an optical range finder is used as the optical observing part 26, the surface of the rolling roll 14 is irradiated with laser light, and the time to when scatter light from the rolling rolls 14 is received and a position are measured, thereby measuring a distance to the surface of the rolling roll 14.

When a laser Doppler velocimeter is used as the optical observing part 26, the surface of the rolling roll 14 is irradiated with laser light, and the traveling velocity of the surface of the rolling roll 14 is measured using the frequency being shifted due to the Doppler effect of scatter light from the rolling roll 14. The distance to the surface of the rolling roll 14 or the traveling velocity of the surface of the rolling roll 14 measured by the optical observing part 26 is output to a computing apparatus, which is not illustrated. The computing apparatus calculates, on the basis of the distance to the roll surface and the traveling velocity of the roll surface, a change in the outer diameter due to the expansion of the rolling roll 14 and wear. It is possible to accurately determine the timing of replacement of the roll and the timing of the surface maintenance, on the basis of the calculated change in the outer diameter due to the expansion of the rolling roll 14 and wear.

When a radiation thermometer is used as the optical observing part 26, the intensity of infrared rays emitted from the rolling roll 14 is measured, thereby measuring a temperature on the surface of the rolling roll 14. It is possible to specify, on the basis of the measured temperature, causes of the thermal expansion that changes a roll profile and of a surface temperature rise that makes the surface of the rolling roll 14 rough.

A gap G between the nozzle tip end and the surface of the rolling roll 14 will be described with reference to FIG. 3. In order to remove cooling water W in the vicinity of the nozzle tip end by injecting gas, gas having a momentum that exceeds a momentum of the cooling water W needs to be injected. In the case of the present embodiment, the size of the gap G was controlled in a predetermined range to enhance the flow velocity of gas to be injected, thereby obtaining gas having a momentum that exceeds a momentum of the cooling water W.

Hereinafter, a conditional expression for enhancing the flow velocity of gas to be injected by narrowing down the gap G is derived. When a nozzle bore is set as d[m], a nozzle discharge area $S_N$ [m$^2$] can be expressed by the following formula (6).

$$S_N = \pi(d/2)^2 \quad (6)$$

When a gap is set as G[m], an area $S_G$ [m$^2$] of the gap G at the nozzle tip end is obtained by the following formula (7). The area $S_G$ [m$^2$] of the gap G at the nozzle tip end refers to an area of an opening portion orthogonal to a direction along which gas flows in the gap G between the nozzle tip end and the surface of the rolling roll 14.

$$S_G = \pi d G \quad (7)$$

In order to enhance the flow velocity of gas to be injected by controlling the size of the gap G within a predetermined range, the area $S_G$ of the gap G needs to be smaller than the nozzle discharge area $S_N$, and a condition of the following formula (8) thus needs to be satisfied.

$$S_G < S_N$$

$$\pi d G < \pi (d/2)^2$$

$$G < d/4 \quad (8)$$

Next, a conditional expression for eliminating the cooling water W that moves together with the surface of the rolling roll 14 moving at a velocity V [m/s], by the gas the flow velocity of which is increased, is derived. The gas jetted out from the nozzle 28 flows into the gap G between the flat surface 29 on the nozzle tip end and the surface of the rolling roll 14, and flows along the surface of the rolling roll 14 at a flow velocity of $V_A$ [m/s]. When a flow rate of the gas is set as Q [m³/s], the flow velocity $V_A$ [m/s] of the gas is expressed by the following formula (9).

$$V_A = Q/S_G = Q/(\pi d G) \tag{9}$$

Accordingly, when a density of gas is set as $\rho_A$ [kg/m³], and a collision cross-sectional area is set as S [m²], a momentum $p_A$ [kg m/s] of the gas is obtained by the following formula (10).

$$p_A = \rho_A V_A^2 S \tag{10}$$

Meanwhile, when a density of the cooling water W is set as $\rho_W$ [kg/m³], the velocity of the cooling water W in the surrounding of the nozzle tip end is equal to the velocity V [m/s] of the rolling rolls 14, so that a momentum $p_W$ [kg m/s] is obtained by the following formula (11).

$$p_W = \rho_W V^2 S \tag{11}$$

Here, the cooling water W can be eliminated when the momentum of the gas is larger than the momentum of the cooling water W, so that a condition of the following formula (12) is derived.

$$p_A > p_W$$

$$\rho_A V_A^2 S > \rho_W V^2 S$$

$$(\rho_W/\rho_A)^{1/2} V_A/V \tag{12}$$

Meanwhile, the pressure loss becomes large as the gap G becomes narrow, so that a selectable lower limit of the gap G is determined by the maximum pressure of the gas to be supplied. Generally, a compressor is used for supply of compressed gas, which has the maximum pressure of 0.7 MPa, and the flow rate can be corresponded by selecting of the size of the compressor. When the area of the gap G on the nozzle tip end is set as $S_G$ [m²] and a nozzle back pressure is set as P [Pa], by the Bernoulli theorem, the flow rate Q [m³/s] of the gas has a relation of the following formula (13).

$$Q = S_G (2/\rho_A)^{1/2} P^{1/2} \tag{13}$$

When the flow rate is constant, the gap G is inversely proportional to the square root of the nozzle back pressure P.

$$Q = \pi d G (2/\rho_A)^{1/2} P^{1/2}$$

$V_A = Q/S_G$ is established, from the formula (12) and the formula (13)

$$V(\rho_W/\rho_A)^{1/2} > (2/\rho_A)^{1/2} P^{1/2}$$

$$P > (\rho_W V^2)/2$$

The abovementioned formula needs to be satisfied at a maximum velocity $V_{max}$, so that an allowable minimum pressure $P_{min}$ can be expressed as follows.

$$P_{min} = \rho_W V_{max}^2/2$$

Here, when $V_{max}$=15 m/s and $\rho_W$=997 kg/m³ are established, $P_{min}$=0.11 MPa is obtained. In other words, the gap G needs to be narrowed such that the nozzle back pressure becomes 0.11 MPa or more.

When a spring constant of the bellows spring 42 is set as k [N/m], a contraction amount is set as x[m], the nozzle back pressure is set as P [Pa], and the nozzle discharge area is set as $S_N$ [m²], by Hooke's law and a balance of forces, the following formula (14) is established.

$$kx = PS_N \tag{14}$$

Here, when a contraction amount at a maximum pressure $P_{max}$ that can be supplied is set as $x_{max}$, $$kx_{max} = P_{max} S_N$$

when a contraction amount at the minimum pressure $P_{min}$ is set as $x_{min}$, $$kx_{min} = P_{min} S_N$$

with these two formulas, $$k(x_{max} - x_{min}) = (P_{max} - P_{min}) S_N$$

is obtained.

When a necessary followed distance changing amount is set as $x_r$, within the range of $x_r$, in order to secure a momentum that can eliminate cooling water and the gap G, the bellows spring 42 needs to be pushed back by the nozzle back pressure and to be contracted, so that the spring constant k needs to satisfy the following formula (15) in order to satisfy $x_r < (x_{max} - x_{min})$.

$$kx_r < (P_{max} - P_{min}) S_N$$

$$k < (P_{max} - P_{min}) S_N / x_r \tag{15}$$

Figure 4:
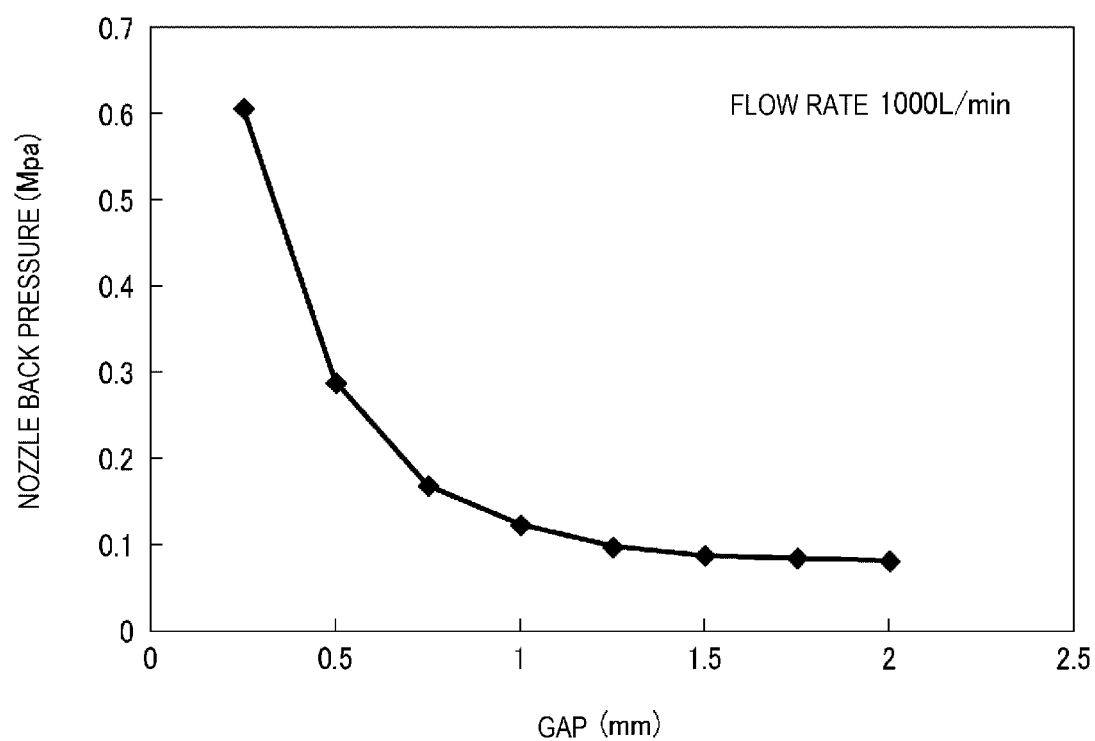
FIG. 4 is a graph illustrating a relation between a gap between a nozzle tip end and a moving object surface, and a nozzle back pressure.

FIG. 4 illustrates the relation obtained by an experiment between the gap G and the nozzle back pressure. In the experiment, in a state where the bellows spring 42 is fixed and neither expands nor contracts, the size of the gap G between the tip end of the nozzle 28 and the surface of the rolling roll 14 is changed, and the relation with the nozzle back pressure was checked. The nozzle bore d was set as φ15 mm, and the flow rate Q was 1000 L/min (constant). The gap G in a state where the nozzle tip end is in contact with the surface of the rolling roll 14 was set as zero. As for the nozzle back pressure, the pressure inside the nozzle was measured by the pressure gage. Within a change range 0.5 MPa (0.1 to 0.6 MPa) of the nozzle back pressure, the fact that the gap G of 0.3 mm or more can be held was identified.

When the contraction amount in the nozzle bore of φ15 mm and the maximum pressure of 0.5 MPa is set to 17 mm, k=5.19 N/mm is obtained. In other words, by selecting a bellows spring having a spring constant k of 5.19 N/mm or less, in the pressure change width of 0.5 MPa of the gas, the rolling roll 14 the position of which has been changed by 17 mm can be followed. The extension and contraction amount corresponding to the position of the rolling roll 14 is referred to as a followed distance changing amount of the surface following nozzle. In this case, the followed distance changing amount is 17 mm.

Operation And Effect

An operation and an effect of the observation device 20 will be described. Firstly, the inner nozzle 34 is pulled out from the outer nozzle 36, and the tip end of the inner nozzle 34 is brought into contact with the rolling roll 14 in a stop state. At this time, the flange portion 35 is not in contact with the edge portion 37, and the nozzle 28 is not being entirely extended.

Next, compressed gas is supplied to the first gas inlet 38. The gas is controlled such that the flow rate becomes uniform. The gas supplied to the first gas inlet 38 raises the pressure in the inside of the nozzle 28 (nozzle back pressure). The nozzle back pressure generates a rearward force in the separating part 32. When the force becomes larger than the forward force by the bellows spring 42, the extending and contracting part 30 contracts. When the extending and contracting part 30 contracts, the outer nozzle 36 moves to the rear side integrally with the extending and contracting part 30 due to the cavity of the inner nozzle 34 being tapered toward the tip end. The inner nozzle 34 protrudes from the outer nozzle 36 until the flange portion 35 comes into contact with the edge portion 37. In this manner, the nozzle 28 entirely extends.

A further rise in the nozzle back pressure causes further contraction of the extending and contracting part 30 to generate the gap G between the nozzle tip end and the rolling roll 14. Compressed gas in the inside of the nozzle is injected to the outside from the nozzle tip end through the gap G. Actually, the gap G is widened to result in a gentle rise of the nozzle back pressure, and when a force to push out the separating part 32 toward the rear direction by the nozzle back pressure and a force by the bellows spring 42 to push out the nozzle 28 toward the front direction are balanced with each other, the rise in the nozzle back pressure and the contraction of the extending and contracting part 30 are stopped. The gap G at this point is referred to as an initial gap.

The inner nozzle 34 is held in a state of being protruded from the outer nozzle 36 by the gas injected. The nozzle 28 having the base end that is closed by the separating part 32 is separated from the extending and contracting part 30, so that the inner nozzle 34 maintains a protruded state even when the extending and contracting part 30 extends and contracts, and a volume in the inside of the nozzle 28 is uniformly held. As illustrated in FIG. 4, the nozzle back pressure and the gap G have a correlation relation, so that the size of the gap G can be estimated by measuring the nozzle back pressure when the flow rate is constant.

Subsequently, an operation of the rolling mill 13 is started. In other words, the rolling rolls 14 are caused to rotate, and the cooling water W is supplied to the rolling rolls 14. The cooling water W adheres on the surfaces of the rolling rolls 14, and rotates integrally with the rolling rolls 14.

In the vicinity of the nozzle tip end of the observation device 20, the cooling water W is removed by the gas injected from the nozzle tip end. The cooling water W flows on the surface of the rolling roll 14 so as to avoid the nozzle tip end. Light emitted from the optical observing part 26 travels on the observation optical path L. Because the cooling water W in the vicinity of the nozzle tip end has been removed, light emitted from the optical observing part 26 reaches the surface of the rolling roll 14 without being interrupted by the cooling water W. Similarly, light reflected on the rolling roll 14 also reaches the optical observing part 26. Therefore, the observation device 20 can observe the surface of the rolling roll 14 by the optical observing part 26 without being received by an influence of the cooling water W.

The optical observing part cannot be applied to the conventional observation device that has used the water column. In other words, bubbles are generated in the inside of the conventional observation device that uses the water column by an interference between the roll and the cooling water. The bubbles may cause a failure in the observation and noise in the ultrasonic range finder, which result in a failure in the measurement in some cases. Moreover, water easily causes variations in refractive index by the flow rate and the temperature, so that the use of the optical observing part such as a laser range finder remarkably lowers the accuracy. Therefore, the conventional observation device that has used the water column cannot observe the surface of the rolling roll by applying the optical observing part.

When the rolling roll 14 that is rolling the rolled material 18 is expanded by the heat of the rolled material 18, the gap G becomes small. When the gap G becomes small, the nozzle back pressure rises (FIG. 4). The extending and contracting part 30 contracts until a force by the bellows spring 42 to push out the separating part 32 in the front direction and a force by the risen nozzle back pressure to push out the separating part 32 in the rear direction are balanced with each other. The extending and contracting part 30 contracts to cause the gap G to return to a state to the same extent as the initial gap, and gas having a predetermined flow velocity is injected from the nozzle tip end.

When the rolling roll 14 that is rolling the rolled material 18 contracts in the radial direction by wear, the gap G becomes large. When the gap G becomes large, the nozzle back pressure is lowered (FIG. 4). The extending and contracting part 30 extends until a force by the bellows spring 42 to push out the separating part 32 in the front direction and a force by the lowered nozzle back pressure to push out the separating part 32 in the rear direction are balanced with each other. The extending and contracting part 30 extends to cause the gap G to return to a state to the same extent as the initial gap, and gas having a predetermined flow velocity is injected from the nozzle tip end.

As in the foregoing, the surface following nozzle 22 controls the gap G so as to come close to the initial gap in such a manner that the extending and contracting part 30 extends and contracts in accordance with the position of the surface of the rolling roll 14 having been changed by the expansion and contraction of the rolling roll 14. Therefore, even when the position of the rolling roll 14 is changed, the observation device 20 can remove the cooling water W in the vicinity of the nozzle tip end by injecting gas at the predetermined flow velocity, and thus can observe the surface of the rolling roll 14 without being received by an influence of the cooling water W. The extending and contracting part 30 is provided between the separating part 32 and the environment box 24, so that the environment box 24 is not moved even when the surface following nozzle 22 extends and contracts by following the rolling roll 14. The surface following nozzle 22 follows changes in the shape and changes in the distance of the rolling roll 14 by a balance between a force that is generated by the nozzle back pressure acting on the separating part 32 and a force that is generated by the bellows spring 42, so that the flow rate of gas does not need to be controlled.

When the rolling roll 14 is replaced, the rotation of the rolling roll 14, the supply of the cooling water W, the supply of gas to the first gas inlet 38 are stopped. Next, compressed gas is supplied between the flange portion 35 and the edge portion 37 via the second gas inlet 40. The gas backs the inner nozzle 34 to the inside of the outer nozzle 36, and the nozzle 28 contracts. The nozzle 28 is contracted to allow the rolling roll 14 to be easily replaced. A change in radius of the rolling roll 14 may occur due to the replacement of the rolling roll 14 in some cases, however, it is possible to secure a field of view of the optical observing part 26 by the following nozzle following the roll surface as long as the radius changing amount is within the followed distance changing amount of the following nozzle.

Example

Figure 5:
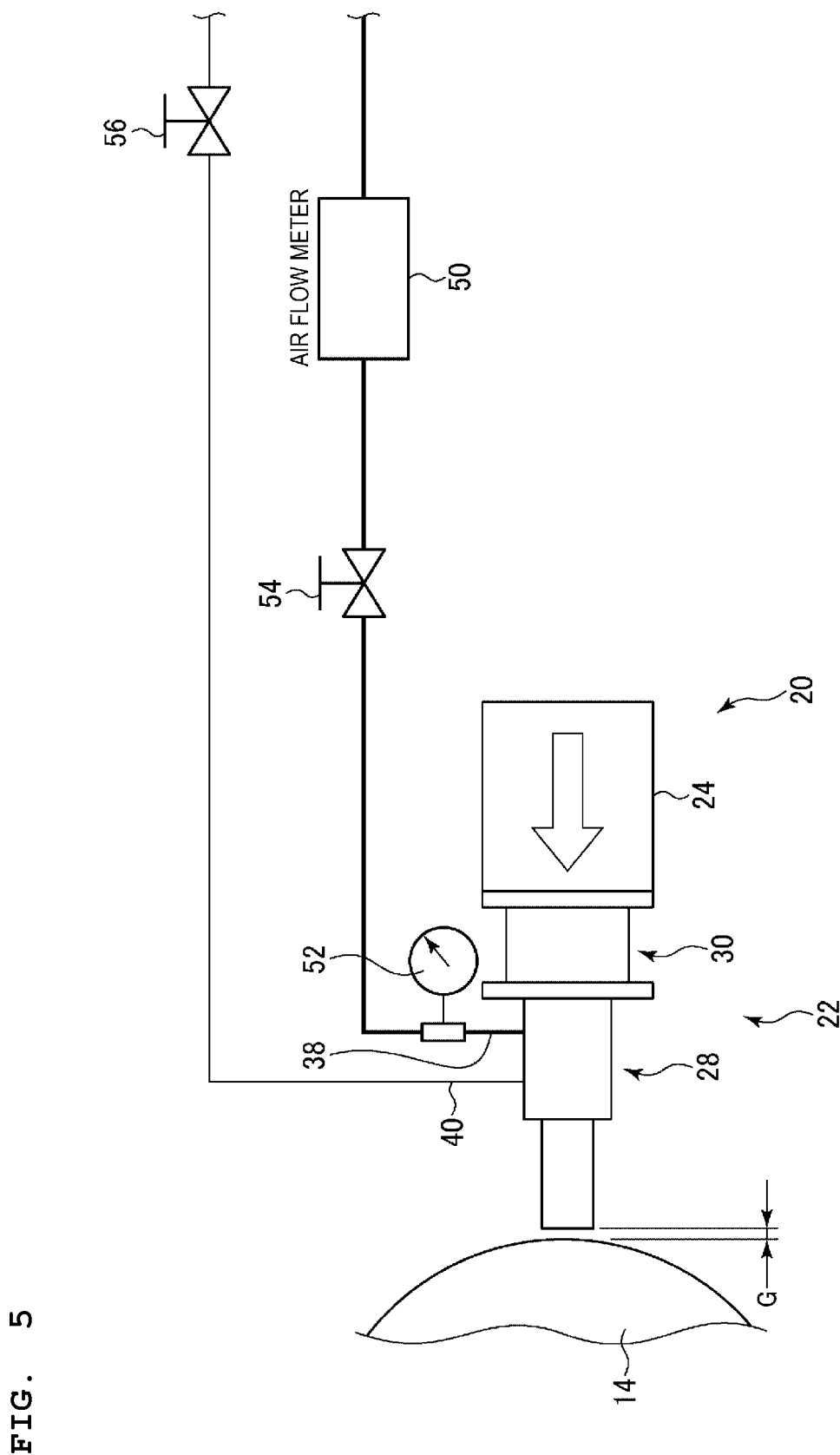
FIG. 5 is a schematic diagram illustrating a device used in an experiment (1).
Figure 6A:
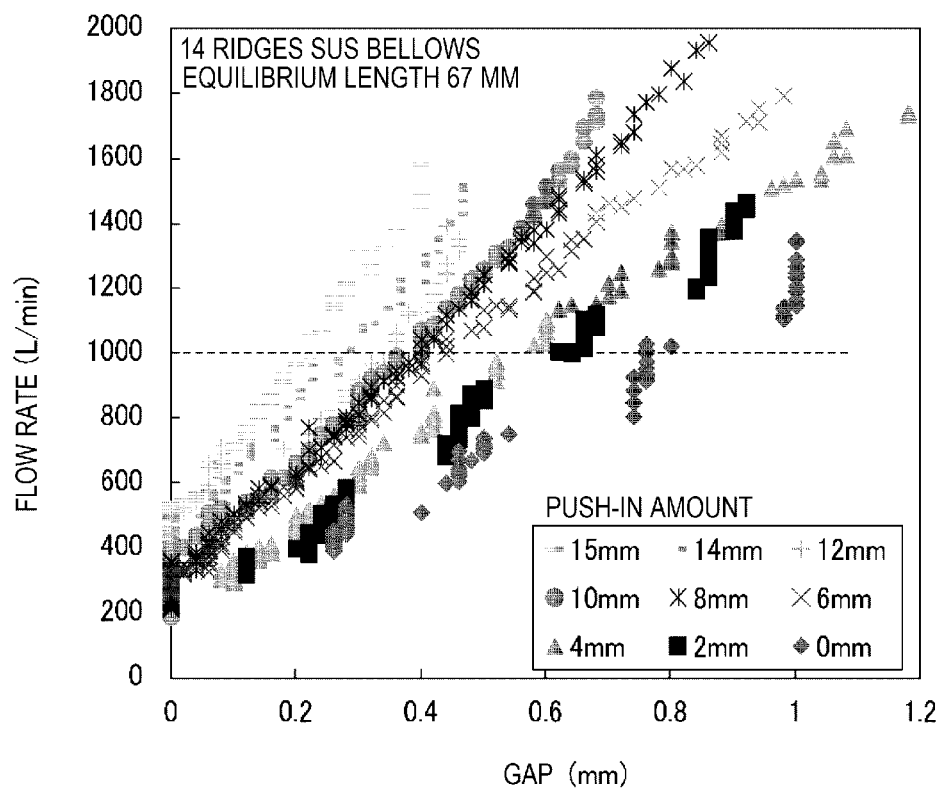
FIGS. 6A and 6B are graphs illustrating a result of the experiment (1)
Figure 6B:
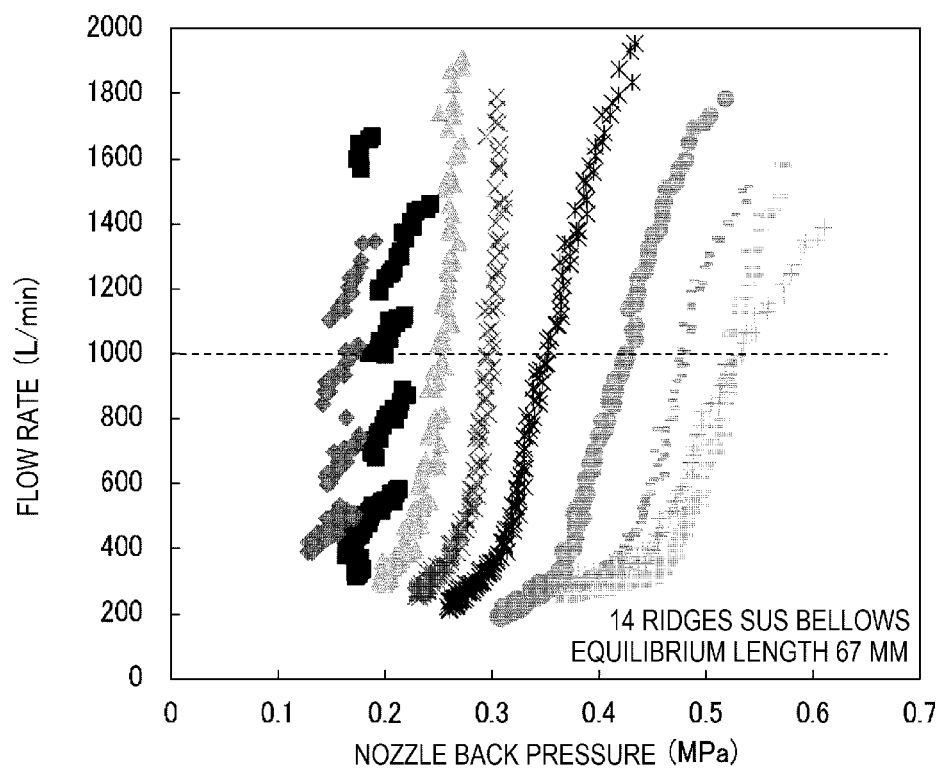

An effect of the surface following nozzle 22 was actually verified using an experiment device illustrated in FIG. 5. A pipe provided with a flow meter 50, a valve 54, and a pressure gage 52 is connected to the first gas inlet 38. Compressed air serving as gas is supplied to the pipe from a compressed gas supply device, which is not illustrated. The nozzle bore was set as φ15 mm. As the bellows spring 42, a bellows spring made of SUS (spring constant k: 5 N/mm, 14 ridges, equilibrium length: 67 mm, extension and contraction amount: 17 mm or more) was used. The flow meter 50 measures the flow rate of compressed air passing through the pipe between the compressed gas supply device and the nozzle 28. The pressure gage 52 measures the nozzle back pressure. As a moving object, a simulation roll 14 having a diameter of 400 mm was used. The gap G was measured from an image obtained by macro photographing a portion between the nozzle tip end and the simulation roll 14. In the experiment device illustrated in this diagram, in a state where the nozzle 28 is entirely extended, the push-in amount at a position where the nozzle tip end comes into contact with a surface of the simulation roll 14 was set to 0 mm, changes in the gap G and the flow rate when the observation device 20 is caused to move toward the simulation roll 14 were measured. FIG. 6A and FIG. 6B each illustrates a result thereof. In FIG. 6A, the horizontal axis represents the gap (mm) and the longitudinal axis represents the flow rate (L/min). In FIG. 6B, the horizontal axis represents the nozzle back pressure (MPa), and the longitudinal axis represents the flow rate (L/min). In the respective push-in amounts, the gap G and the flow rate have an approximate proportional relation, and as the push-in amount is larger, the gap G is more difficult to be widened. Meanwhile, the nozzle back pressure gently rises as the flow rate increases, so that it has been found that the nozzle back pressure becomes higher as the push-in amount is larger.

Figure 7A:
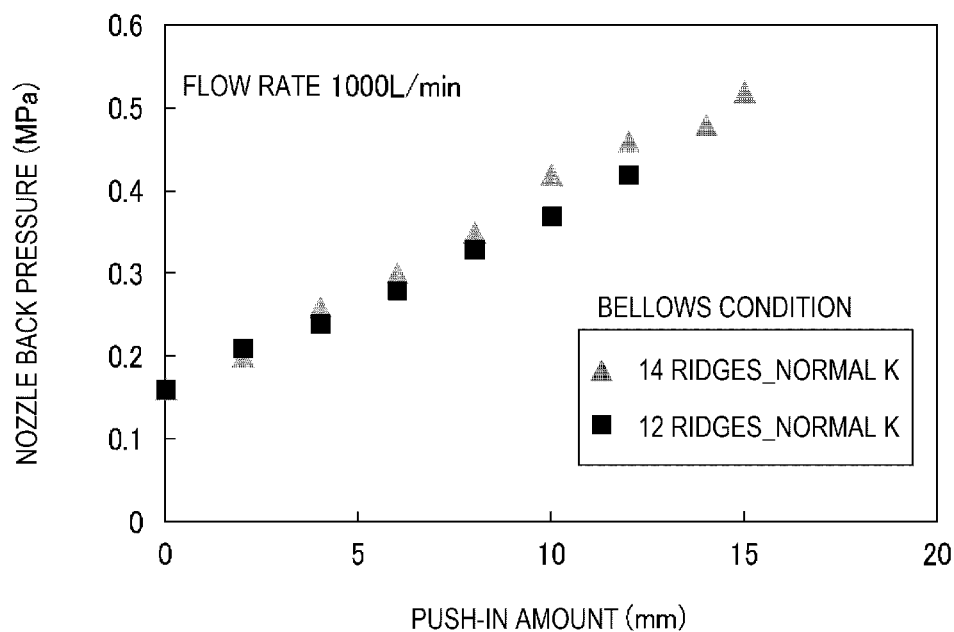
FIGS. 7A and 7B are graphs of an experiment result at the flow rate of 1000 L/min by being taken out.
Figure 7B:
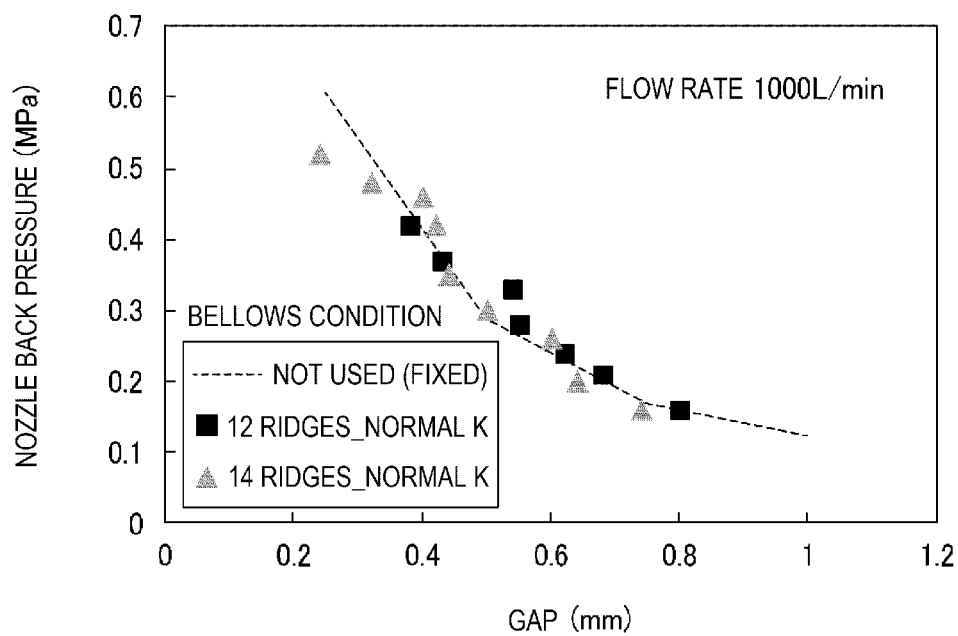

FIG. 7A illustrates a relation between the push-in amount and the nozzle back pressure, and FIG. 7B illustrates a relation between the gap G and the nozzle back pressure, at the time when the flow rate Q is 1000 L/min. It has been identified that the bellows used this time can secure the gap G of 0.3 mm, which is approximately in accordance with the design, also at the push-in amount of 15 mm, by the nozzle back pressure of 0.5 MPa. The push-in amount and the nozzle back pressure are coincident with those in the relation formula (abovementioned formula (13)) in which the bellows is not used. Therefore, it has been understood that the measurement of the nozzle back pressure enables the push-in amount to be estimated. The nozzle back pressure and the size of the gap G also have a correlation, so that the size of the gap G can also be estimated from the nozzle back pressure. The maximum gap is 0.8 mm when the push-in amount is 0 mm. A velocity V of the moving object that can eliminate the cooling water at this time is 15.9 m/s, from the formula (12) ($p_A$: 1.293 kg/m$^3$ (compressed air is used), $p_W$: 997 kg/m$^3$). In other words, under the abovementioned condition, when the rotation velocity of the roll is 15.9 m/s or less, the cooling water can be eliminated.

Figure 8:
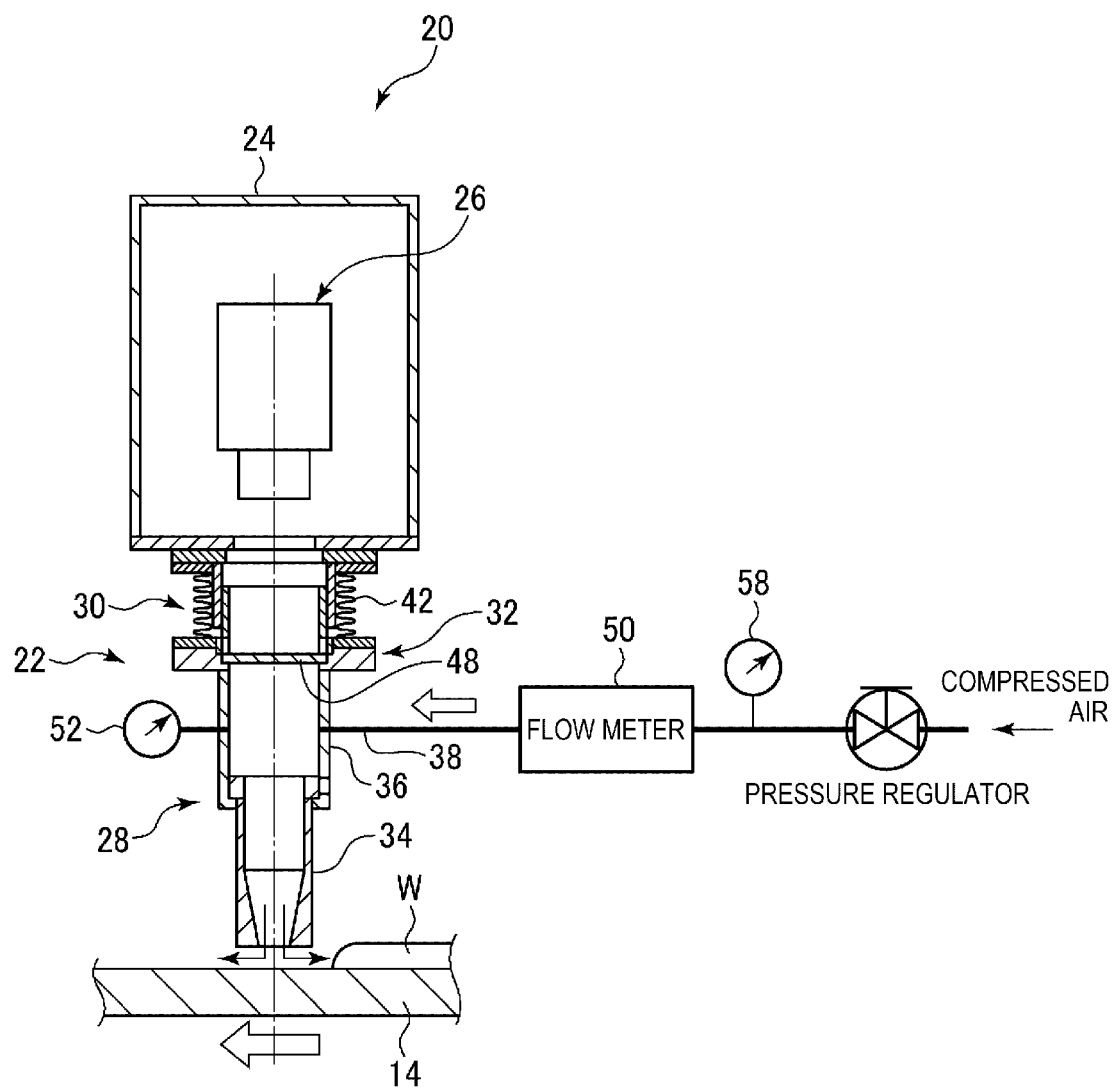
FIG. 8 is a schematic diagram illustrating a device used in an experiment (2).
Figure 9A:
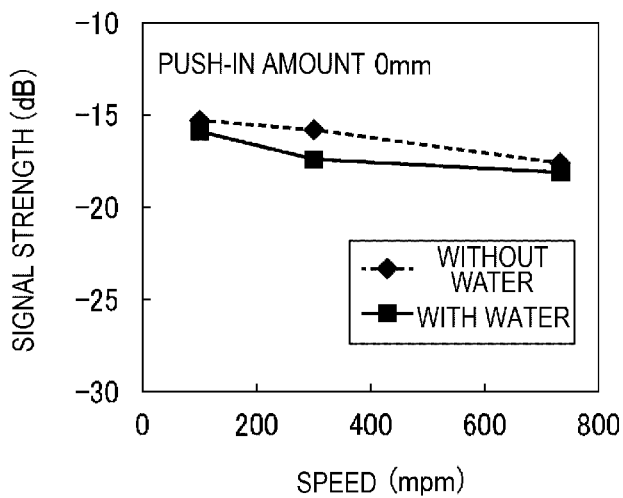
FIGS. 9A to 9C are graphs illustrating results of the experiment (2)
Figure 9B:
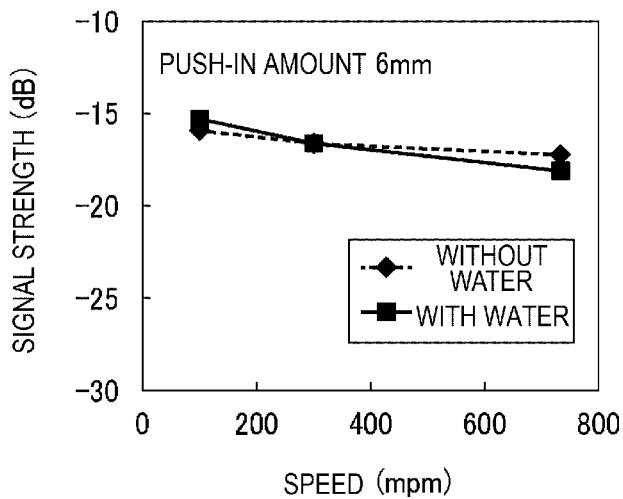
Figure 9C:
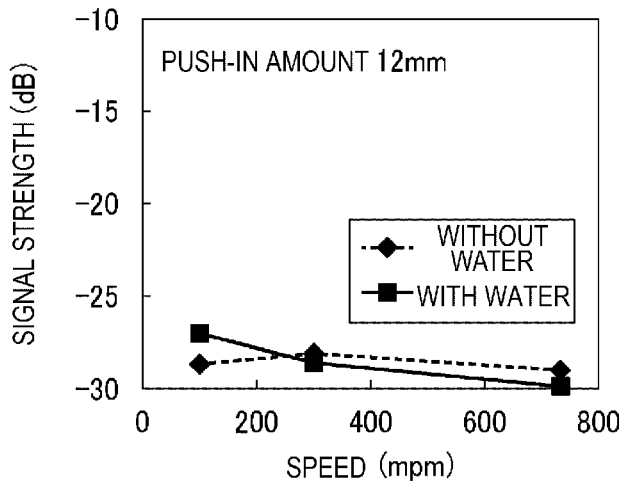

Next, an effect by the observation device 20 is verified using an experiment device illustrated in FIG. 8. As a moving object, a disc 14 was used. Compressed air having a flow rate of 1000 L/min (constant) was supplied to the first gas inlet 38. In a state where the nozzle 28 is extended, the field-of-view securing property when the push-in amount in a state where the nozzle tip end is in contact with a surface of the disc 14 is set to 0 mm, and the observation device 20 is caused to move toward the disc 14 by 6 mm and 12 mm, was identified. The surface velocity of the disc 14 was set to 95, 300, and 730 mpm (respectively, 1.6 m/s, 5 m/s, and 12.2 m/s) of three types. In a case where water was supplied to the disc 14 (with water) and in a case where no water was supplied (without water), the optical observing part 26 housed in the inside of the environment box 24 irradiated a moving object surface with light, received scatter light from the moving object, and measured the signal strength of the scatter light. FIGS. 9A to 9C illustrate results thereof. In FIGS. 9A to 9C, the horizontal axis represents the velocity (mpm) and the longitudinal axis represents the signal strength (dB); and FIG. 9A illustrates the result at the push-in amount of 0 mm, FIG. 9B illustrates the result at the push-in amount of 6 mm, and FIG. 9C illustrates the result at the push-in amount of 12 mm. No difference in signal strength based on the presence or absence of water was recognized. Therefore, the water was removed in the surface following nozzle 22, so that the observation device 20 can observe the moving object surface without receiving an influence by the water.

Modification Example

The present invention is not limited to the abovementioned embodiment, but can be changed as appropriate within the scope of the present invention.

The case where the present invention is applied to a rolling roll serving as a moving object has been described, however, the present invention is not limited thereto, but can be applied to an axisymmetric shape object such as a pipe and a machine component. Moreover, the present invention can be applied to, not limited to the axisymmetric shape object, a planar moving object, such as a steel sheet during cooling, as long as a distance change range to the surface is within the followed distance change of the following nozzle, and the surface observation, the temperature measurement, the length measurement, and the like, of a target moving object, can be performed. The case where the present invention is applied to a hot rolling roll serving as a moving object has been described, however, the present invention is not limited thereto, but can be applied to a cold rolling mill roll.

The case where the bellows spring 42 is used as an elastic body has been described, however, the present invention is not limited thereto, but for example, a coil spring, rubber, or the like may be used.

REFERENCE SIGNS LIST

14: rolling roll (moving object)
20: observation device
22: surface following nozzle
24: environment box
26: optical observing part
28: nozzle
29: flat surface
30: extending and contracting part
32: separating part
34: inner nozzle
36: outer nozzle
42: bellows spring (elastic body)
48: optical window
50: flow meter
52: pressure gage

The invention claimed is:
1. A surface following system, comprising:
a cooling water supplying part configured to supply cooling water to a surface of a moving object; and a surface following nozzle configured to inject gas toward the surface of the moving object, the surface following nozzle comprising:
- a nozzle having a tip end as a first end and a base end as a second end and configured to inject the gas from the tip end thereof;
- a separating part configured to close the base end of the nozzle; and
- an extending and contracting part that is provided at the base end of the nozzle via the separating part, and configured to extend and contract along an axial direction of the nozzle in response to changes in pressure inside the nozzle depending on a gap between the tip end of the nozzle and the surface of the moving object, wherein,
the extending and contracting part includes an elastic body configured to apply a forward force with respect to the nozzle,
when a spring constant of the elastic body is set as k [N/m], a necessary followed distance changing amount is set as $x_r$[m], a maximum pressure of the gas that can be supplied is set as $P_{max}$ [Pa], a minimum pressure of allowable gas is set as $P_{min}$ [Pa], a nozzle discharge area is set as $S_N$ [m$^2$], a maximum velocity of the cooling water in a vicinity of the tip end of the nozzle is set as $V_{max}$, and a density of the cooling water is set as $\rho_W$ [kg/m$^3$], the spring constant k of the elastic body satisfies following formulas (1) and (2), and
a contraction amount x[m] of the elastic body is within a range from $x_{min}$ to $x_{max}$ indicated by following formulas (3) and (4) to obtain the gas having a momentum that exceeds a momentum of the cooling water, $$k<(P_{max}-P_{min})S_N/x_r \qquad (1)$$

$$P_{min}=\rho_W V_{max}^2/2 \qquad (2)$$

$$x_{min}=P_{min}S_N/k \qquad (3)$$

$$x_{max}=P_{max}S_N/k \qquad (4).$$

2. The surface following system according to claim 1, further comprising:
- a flow meter provided to a pipe that is connected to the nozzle and configured to supply the gas to the nozzle; and
- a pressure gage configured to measure a pressure in an inside of the nozzle.

3. The surface following system according to claim 1, wherein the elastic body is a bellows.

4. The surface following system according to claim 1, wherein the nozzle includes an inner nozzle, and an outer nozzle coaxially provided to the inner nozzle, and by a pressure of the gas to be injected, the inner nozzle protrudes with respect to the outer nozzle.

5. The surface following system according to claim 4, wherein a material for the inner nozzle contains a phenol resin, a solid lubricant, and reinforcement fiber.

6. The surface f following system according to claim 1, wherein the surface following nozzle includes a flat surface that is parallel to a direction orthogonal to the axial direction at the tip end of the nozzle, and the tip end of the nozzle has an outer diameter twice to four times an inner diameter.

7. The surface f following system according to claim 1, wherein a cavity of the nozzle is tapered toward the tip end.

8. The surface following system according to claim 1, wherein the separating part includes an optical window.

9. An observation device for a moving object surface, comprising:
- the surface following system according to claim 8;
- an environment box provided at a rear side of the surface following nozzle;
- an optical observing part housed inside the environment box, wherein
- an observation optical path is provided from the optical observing part over the tip end of the nozzle.

10. An observation method for a moving object surface, comprising:
- monitoring the moving object, using the observation device according to claim 9; and
- determining a timing to replace the moving object or controlling a use condition of the moving object.

11. The observation method for a moving object surface according to claim 10, wherein when a bore of the nozzle is set as d[m], a density of the gas is set as $\rho_A$ [kg/m$^3$], a density of the cooling water is set as $\rho_W$ [kg/m$^3$], a velocity of the moving object is set as V [m/s], a flow rate of the gas to be jetted is set as Q [m$^3$/s], and the gap between the surface of the moving object and the tip end of the nozzle is set as G[m], a following formula (5) is satisfied, $$(\beta_A/\beta_W)^{1/2}Q/(\pi dV)>G \qquad (5).$$

12. The observation method for a moving object surface according to claim 10, wherein based on a flow rate of the gas flowing through a pipe through which the gas is supplied to the nozzle and a nozzle back pressure, at least one of a push-in amount of the elastic body or a size of the gap between the tip end of the nozzle and the surface of the moving object is estimated.

* * * * *